US011039231B2

(12) United States Patent
Chua et al.

(10) Patent No.: US 11,039,231 B2
(45) Date of Patent: Jun. 15, 2021

(54) PACKAGE WITH ACOUSTIC SENSING DEVICE(S) AND MILLIMETER WAVE SENSING ELEMENTS

(71) Applicant: Infineon Technologies AG, Neubiberg (DE)

(72) Inventors: Kok Yau Chua, Melaka (MY); Chee Yang Ng, Johor (MY)

(73) Assignee: INFINEON TECHNOLOGIES AG, Neubiberg (DE)

(*) Notice: Subject to any disclaimer, the term of this patent is extended or adjusted under 35 U.S.C. 154(b) by 16 days.

(21) Appl. No.: 16/682,468

(22) Filed: Nov. 13, 2019

(65) Prior Publication Data
US 2020/0154183 A1 May 14, 2020

(30) Foreign Application Priority Data
Nov. 14, 2018 (EP) .................................. 18206325

(51) Int. Cl.
*H04R 1/02* (2006.01)
*G01S 13/86* (2006.01)
(Continued)

(52) U.S. Cl.
CPC .............. *H04R 1/025* (2013.01); *G01S 13/86* (2013.01); *G10L 15/22* (2013.01); *H04R 3/00* (2013.01); *H04R 31/006* (2013.01)

(58) Field of Classification Search
CPC ........ H04R 1/025; H04R 3/00; H04R 31/006; G01S 13/86; G10L 15/22
(Continued)

(56) References Cited

U.S. PATENT DOCUMENTS 4,241,347 A 12/1980 Albanese et al.
6,147,572 A 11/2000 Kaminski et al.
(Continued)

FOREIGN PATENT DOCUMENTS

CN 1463161 A 12/2003
CN 1716695 A 1/2006
(Continued)

OTHER PUBLICATIONS

"BT24MTR11 Using BGT24MTR11 in Low Power Applications 24 GHz Rader," Application Note AN341, Revision: Rev 1.0, Infineon Technologies AG, Munich, Germany, Dec. 2, 2013, 25 pages.
(Continued)

*Primary Examiner* — Ammar T Hamid
(74) *Attorney, Agent, or Firm* — Slater Matsil, LLP (57) ABSTRACT

In accordance with an embodiment a package includes: a package structure which defines inner surfaces delimiting an inner volume and outer surfaces directed towards an exterior of the package; at least one acoustic sensor element applied to at least one of the inner surfaces, to convert acoustic waves arriving from the exterior of the package into acoustic information in the form of electric signals; a plurality of millimeter wave sensing elements applied to at least one of the outer surfaces, to receive reflected radar signals from objects in the exterior of the package; and a circuitry applied to at least one of the inner surfaces of the package structure, wherein the circuitry is electrically connected to the at least one acoustic sensor element and the plurality of millimeter wave sensing elements to process the acoustic information and the reflected radar signals.

19 Claims, 7 Drawing Sheets

(51) Int. Cl.
*G10L 15/22* (2006.01)
*H04R 3/00* (2006.01)
*H04R 31/00* (2006.01)

(58) Field of Classification Search
USPC .................................................. 381/332, 334
See application file for complete search history.

(56) References Cited

U.S. PATENT DOCUMENTS

| | | | |
|---|---|---|---|
| 6,414,631 | B1 | 7/2002 | Fujimoto |
| 6,636,174 | B2 | 10/2003 | Arikan et al. |
| 7,048,973 | B2 | 5/2006 | Sakamoto et al. |
| 7,057,564 | B2 | 6/2006 | Tsai et al. |
| 7,171,052 | B2 | 1/2007 | Park |
| 7,317,417 | B2 | 1/2008 | Arikan et al. |
| 7,596,241 | B2 | 9/2009 | Rittscher et al. |
| 7,692,574 | B2 | 4/2010 | Nakagawa |
| 7,873,326 | B2 | 1/2011 | Sadr |
| 7,889,147 | B2 | 2/2011 | Tam et al. |
| 8,228,382 | B2 | 7/2012 | Pattikonda |
| 8,497,805 | B2 | 7/2013 | Rofougaran et al. |
| 8,659,369 | B2 | 2/2014 | Rofougaran et al. |
| 8,731,502 | B2 | 5/2014 | Salle et al. |
| 8,836,596 | B2 | 9/2014 | Richards et al. |
| 8,847,814 | B2 | 9/2014 | Himmelstoss et al. |
| 8,860,532 | B2 | 10/2014 | Gong et al. |
| 8,976,061 | B2 | 3/2015 | Chowdhury |
| 9,172,132 | B2 | 10/2015 | Kam et al. |
| 9,182,476 | B2 | 11/2015 | Wintermantel |
| 9,202,105 | B1 | 12/2015 | Wang et al. |
| 9,413,079 | B2 | 8/2016 | Kamgaing et al. |
| 9,495,600 | B2 | 11/2016 | Heu et al. |
| 9,886,095 | B2 | 2/2018 | Pothier |
| 9,935,065 | B1 | 4/2018 | Baheti et al. |
| 2003/0179127 | A1 | 9/2003 | Wienand |
| 2004/0238857 | A1 | 12/2004 | Beroz et al. |
| 2006/0001572 | A1 | 1/2006 | Gaucher et al. |
| 2006/0049995 | A1 | 3/2006 | Imaoka et al. |
| 2006/0067456 | A1 | 3/2006 | Ku et al. |
| 2007/0210959 | A1 | 9/2007 | Herd et al. |
| 2008/0106460 | A1 | 5/2008 | Kurtz et al. |
| 2008/0238759 | A1 | 10/2008 | Carocari et al. |
| 2008/0291115 | A1 | 11/2008 | Doan et al. |
| 2008/0308917 | A1 | 12/2008 | Pressel et al. |
| 2009/0073026 | A1 | 3/2009 | Nakagawa |
| 2009/0085815 | A1 | 4/2009 | Jakab et al. |
| 2009/0153428 | A1 | 6/2009 | Rofougaran et al. |
| 2009/0315761 | A1 | 12/2009 | Walter et al. |
| 2010/0207805 | A1 | 8/2010 | Haworth |
| 2011/0299433 | A1 | 12/2011 | Darabi et al. |
| 2012/0087230 | A1 | 4/2012 | Guo et al. |
| 2012/0092284 | A1 | 4/2012 | Rofougaran et al. |
| 2012/0116231 | A1 | 5/2012 | Liao et al. |
| 2012/0195161 | A1 | 8/2012 | Little et al. |
| 2012/0206339 | A1 | 8/2012 | Dahl |
| 2012/0265486 | A1 | 10/2012 | Klofer et al. |
| 2012/0268314 | A1 | 10/2012 | Kuwahara et al. |
| 2012/0280900 | A1 | 11/2012 | Wang et al. |
| 2013/0027240 | A1 | 1/2013 | Chowdhury |
| 2013/0106673 | A1 | 5/2013 | McCormack et al. |
| 2014/0028542 | A1 | 1/2014 | Lovitt et al. |
| 2014/0070994 | A1 | 3/2014 | Schmalenberg et al. |
| 2014/0145883 | A1 | 5/2014 | Baks et al. |
| 2014/0324888 | A1 | 10/2014 | Xie et al. |
| 2015/0181840 | A1 | 7/2015 | Tupin, Jr. et al. |
| 2015/0185316 | A1 | 7/2015 | Rao et al. |
| 2015/0212198 | A1 | 7/2015 | Nishio et al. |
| 2015/0243575 | A1 | 8/2015 | Strothmann et al. |
| 2015/0277569 | A1 | 10/2015 | Sprenger et al. |
| 2015/0325925 | A1 | 11/2015 | Kamgaing et al. |
| 2015/0346820 | A1 | 12/2015 | Poupyrev et al. |
| 2015/0348821 | A1 | 12/2015 | Iwanaga et al. |
| 2015/0364816 | A1 | 12/2015 | Murugan et al. |
| 2016/0018511 | A1 | 1/2016 | Nayyar et al. |
| 2016/0041617 | A1 | 2/2016 | Poupyrev |
| 2016/0041618 | A1 | 2/2016 | Poupyrev |
| 2016/0061942 | A1 | 3/2016 | Rao et al. |
| 2016/0061947 | A1 | 3/2016 | Patole et al. |
| 2016/0098089 | A1 | 4/2016 | Poupyrev |
| 2016/0103213 | A1 | 4/2016 | Ikram et al. |
| 2016/0109566 | A1 | 4/2016 | Liu et al. |
| 2016/0118353 | A1 | 4/2016 | Ahrens et al. |
| 2016/0135655 | A1 | 5/2016 | Ahn et al. |
| 2016/0146931 | A1 | 5/2016 | Rao et al. |
| 2016/0146933 | A1 | 5/2016 | Rao et al. |
| 2016/0178730 | A1 | 6/2016 | Trotta et al. |
| 2016/0187462 | A1 | 6/2016 | Altus et al. |
| 2016/0191232 | A1 | 6/2016 | Subburaj et al. |
| 2016/0223651 | A1 | 8/2016 | Kamo et al. |
| 2016/0240907 | A1 | 8/2016 | Haroun |
| 2016/0249133 | A1 | 8/2016 | Sorensen |
| 2016/0252607 | A1 | 9/2016 | Saboo et al. |
| 2016/0259037 | A1 | 9/2016 | Molchanov et al. |
| 2016/0266233 | A1 | 9/2016 | Mansour |
| 2016/0269815 | A1 | 9/2016 | Liao et al. |
| 2016/0291130 | A1 | 10/2016 | Ginsburg et al. |
| 2016/0299215 | A1 | 10/2016 | Dandu et al. |
| 2016/0306034 | A1 | 10/2016 | Trotta et al. |
| 2016/0320852 | A1 | 11/2016 | Poupyrev |
| 2016/0320853 | A1 | 11/2016 | Lien et al. |
| 2016/0327633 | A1 | 11/2016 | Kumar Y.B. et al. |
| 2016/0334502 | A1 | 11/2016 | Ali et al. |
| 2016/0349845 | A1 | 12/2016 | Poupyrev et al. |
| 2017/0033062 | A1 | 2/2017 | Liu et al. |
| 2017/0045607 | A1 | 2/2017 | Bharadwaj et al. |
| 2017/0052618 | A1 | 2/2017 | Lee et al. |
| 2017/0054449 | A1 | 2/2017 | Mani et al. |
| 2017/0060254 | A1 | 3/2017 | Molchanov et al. |
| 2017/0070952 | A1 | 3/2017 | Balakrishnan et al. |
| 2017/0074974 | A1 | 3/2017 | Rao et al. |
| 2017/0074980 | A1 | 3/2017 | Adib et al. |
| 2017/0090014 | A1 | 3/2017 | Subburaj et al. |
| 2017/0090015 | A1 | 3/2017 | Breen et al. |
| 2017/0115377 | A1 | 4/2017 | Giannini et al. |
| 2017/0131395 | A1 | 5/2017 | Reynolds et al. |
| 2017/0139036 | A1 | 5/2017 | Nayyar et al. |
| 2017/0141453 | A1 | 5/2017 | Waelde et al. |
| 2017/0170947 | A1 | 6/2017 | Yang |
| 2017/0176574 | A1 | 6/2017 | Eswaran et al. |
| 2017/0192847 | A1 | 7/2017 | Rao et al. |
| 2017/0201019 | A1 | 7/2017 | Trotta |
| 2017/0212597 | A1 | 7/2017 | Mishra |
| 2017/0364160 | A1 | 12/2017 | Malysa et al. |
| 2018/0046255 | A1 | 2/2018 | Rothera et al. |
| 2018/0071473 | A1 | 3/2018 | Trotta et al. |
| 2018/0101239 | A1 | 4/2018 | Yin et al. |
| 2020/0135198 | A1* | 4/2020 | Mandl ............... G01S 7/003 |

FOREIGN PATENT DOCUMENTS

| | | | |
|---|---|---|---|
| CN | 101490578 A | 7/2009 | |
| CN | 101585361 A | 11/2009 | |
| CN | 102788969 A | 11/2012 | |
| CN | 102967854 A | 3/2013 | |
| CN | 103529444 A | 1/2014 | |
| CN | 203950036 U | 11/2014 | |
| DE | 102006033693 A1 | 2/2007 | |
| DE | 102008054570 A1 | 6/2010 | |
| DE | 102006033693 B4 * | 8/2011 | ........... G01S 15/931 |
| DE | 102011100907 A1 | 1/2012 | |
| DE | 102011075725 A1 | 11/2012 | |
| DE | 102014118063 A1 | 7/2015 | |
| EP | 2793043 A1 | 10/2014 | |
| GB | 2247799 A | 3/1992 | |
| JP | 2001174539 A | 6/2001 | |
| JP | 2004198312 A | 7/2004 | |
| JP | 2006234513 A | 9/2006 | |
| JP | 2008029025 A | 2/2008 | |
| JP | 2008089614 A | 4/2008 | |
| JP | 2009069124 A | 4/2009 | |
| JP | 2011529181 A | 12/2011 | |
| JP | 2012112861 A | 6/2012 | |
| JP | 2013521508 A | 6/2013 | |
| JP | 2014055957 A | 3/2014 | |

(56) References Cited

FOREIGN PATENT DOCUMENTS

| KR | 20090063166 A | 6/2009 |
|----|---------------|--------|
| KR | 20140082815 A | 7/2014 |
| WO | 2007060069 A1 | 5/2007 |
| WO | 2013009473 A2 | 1/2013 |
| WO | 2016033361 A1 | 3/2016 |

OTHER PUBLICATIONS

Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.

Chen, Xiaolong et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, pp. 1002-1018.

Chuanhua, Du, "FMCW Radar Range-Doppler Processing and Beam Formation Technology," Chinese Doctoral Dissertations & Master's Theses Full Text Databases (Masters)—Information Science and Technology Series, China National Knowledge Infrastructure, ISSN 1674-0246, CN 11-9144/G, Dec. 16, 2004-Mar. 2015, 14 pages.

Deacon, Peter et al., "Frequency Modulated Continuous Wave (FMCW) Radar," Design Team 6 Technical Lecture, Nov. 9, 2011, 27 pages.

Dham, Vivek "Programming Chirp Parameters in TI Radar Devices," Application Report SWRA553, Texas Instruments, May 2017, 15 pages.

Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.

Dooring Alert Systems, "Riders Matter," http:\\dooringalertsystems.com, printed Oct. 4, 2017, 16 pages.

Filippelli, Mario et al., "Respiratory dynamics during laughter," J Appl Physiol, (90), 1441-1446, Apr. 2001, http://ap.physiology.org/content/jap/90/4/1441.full.pdf.

Fox, Ben, "The Simple Technique That Could Save Cyclists' Lives," https://www.outsideonline.com/2115116/simple-technique-could-save-cyclists-lives, Sep. 19, 2016, 6 pages.

Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.

Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.

Inac, Ozgur et al., "A Phased Array RFIC with Built-In Self-Test Capabilities," IEEE Transactions on Microwave Theory and Techniques, vol. 60, No. 1, Jan. 2012, 10 pages.

Killedar, Abdulraheem "XWR1xxx Power Management Optimizations—Low Cost LC Filter Solution," Application Report SWRA577, Texas Instruments, Oct. 2017, 19 pages.

Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.

Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.

Lim, Soo-Chul et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/journal/sensors, Jul. 15, 2009, 12 pages.

Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.

Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.

Qadir, Shahida G., et al., "Focused ISAR Imaging of Rotating Target in Far-Field Compact Range Anechoic Chamber," 14th International Conference on Aerospace Sciences & Aviation Technology, ASAT-14-241-IP, May 24-26, 2011, 7 pages.

Richards, Mark A., "Fundamentals of Radar Signal Processing," McGraw Hill Electronic Engineering, ISBN: 0-07-144474-2, Jun. 2005, 93 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.

Simon, W., et al., "Highly Integrated KA-Band TX Frontend Module Including 8×8 Antenna Array," IMST GmbH, Germany, Asia Pacific Microwave Conference, Dec. 7-10, 2009, 63 pages.

Suleymanov, Suleyman, "Design and Implementation of an FMCW Radar Signal Processing Module for Automotive Applications," Master Thesis, University of Twente, Aug. 31, 2016, 61 pages.

Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

Thayaparan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.

Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.

Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, Apr. 15, 2014, 11 pages.

* cited by examiner

PACKAGE WITH ACOUSTIC SENSING DEVICE(S) AND MILLIMETER WAVE SENSING ELEMENTS

This application claims the benefit of European Application No. 18206325.5, filed on Nov. 14, 2018, which application is hereby incorporated herein by reference.

TECHNICAL FIELD

The present document relates to a package, which may comprise at least one acoustic sensor element and at least one millimeter wave sensing element.

BACKGROUND

Radar-assisted microphone array applications rely on an audio beamforming function assisted by a radar function. The audio beamforming function permits to reduce the noise from sound sources which are different from a target sound source. The radar function permits to identify the target sound source.

As multiple elements of a microphone array and a radar are needed, complicated and bulky equipment is accordingly necessary. As both different microphones and different antennas are to be spatially distributed according to different directions, coexistence is complicated in a miniaturized device.

SUMMARY

In accordance with an embodiment, a package includes a package structure which defines inner surfaces delimiting an inner volume and outer surfaces directed towards an exterior of the package; at least one acoustic sensor element disposed on at least one of the inner surfaces, the at least one acoustic sensor element configured to convert acoustic waves arriving from the exterior of the package into electric signals representing acoustic information; a plurality of millimeter wave sensing elements disposed on at least one of the outer surfaces, to receive reflected radar signals from objects in the exterior of the package; and circuitry disposed on at least one of the inner surfaces of the package structure, wherein the circuitry is electrically connected to the at least one acoustic sensor element and the plurality of millimeter wave sensing elements to process the acoustic information and the reflected radar signals.

In accordance with another embodiment, a method of manufacturing a package includes applying circuitry to a substrate; applying millimeter wave radar element(s) and external metal trace(s) to an external surface and/or external lateral surfaces of a lid or of a further substrate; applying first internal metal trace(s) to an internal surface of the lid or of the further substrate, the first internal metal trace(s) being electrically connected to the external metal trace(s); applying microphone element(s) to the substrate or to the internal surface of the lid or of the further substrate; preparing electric connection element(s) in preparation of an electrical connection between the millimeter wave radar element(s) and the circuitry; and mechanically connecting the lid or further substrate to the substrate, so as to obtain an electrical connection between the millimeter wave radar element(s) and the circuitry.

In accordance with a further embodiment, a method of manufacturing a package includes applying circuitry to a substrate; applying first internal metal trace(s) to an internal surface of a further substrate, the first internal metal trace(s) being electrically connected to external metal trace(s); applying package acoustic sensor element(s) to the substrate or to the further substrate; preparing electric connection element(s) in preparation of an electrical connection with the circuitry; mechanically connecting the further substrate to the substrate, so as to obtain the electrical connection between the electric connection element(s) and the circuitry; inserting liquid filling material in a void space between the further substrate and the substrate; and applying millimeter wave radar element(s) and external metal trace(s) to an external surface and/or external lateral surfaces of the further substrate.

DETAILED DESCRIPTION OF ILLUSTRATIVE EMBODIMENTS

Figure 1:
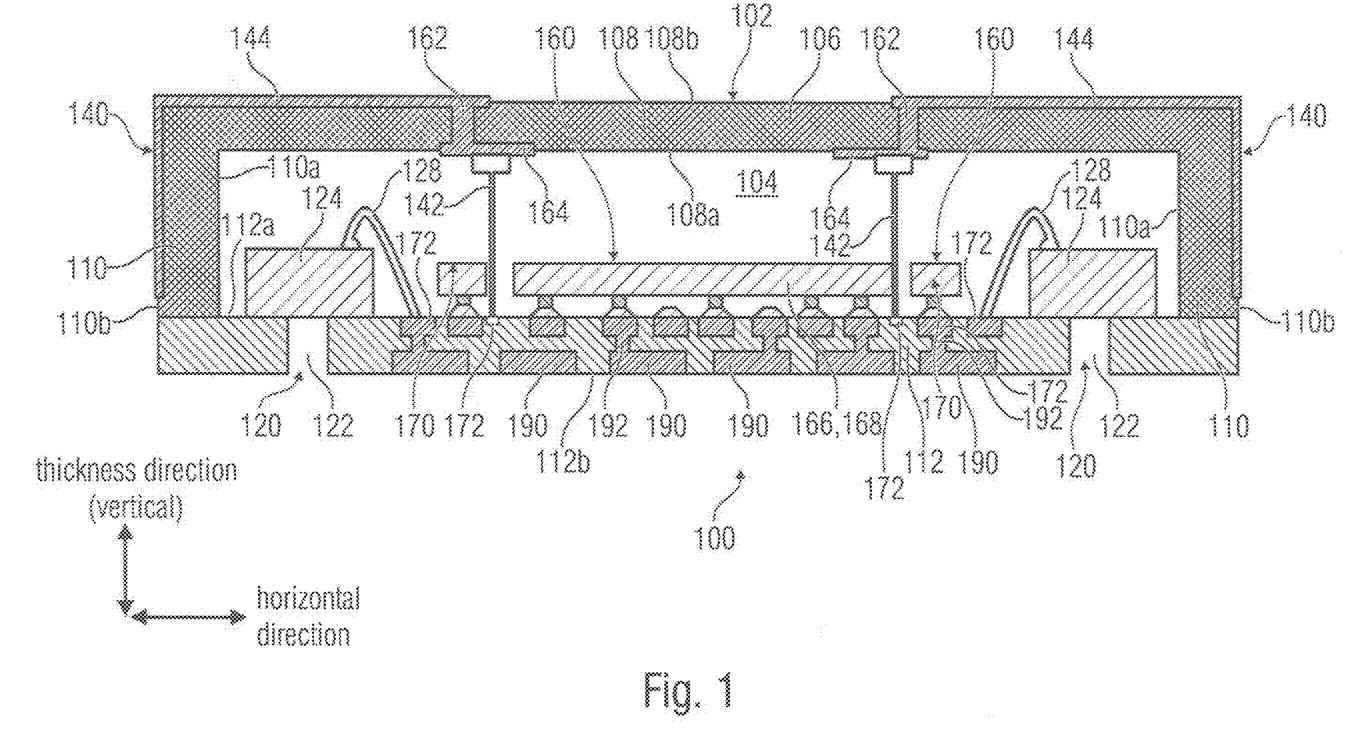
FIG. 1 shows a cross-sectional view of a package according to an example.

FIG. 1 shows a first example of a package 100. The package 100 comprises a package structure 102 which defines inner surfaces 108a, 110a, 112a and outer surfaces 108b, 110b, 112b. The inner surfaces 108a, 110a, 112a delimit an inner volume 104, for containing circuital elements. In this example the inner volume 104 is void, but in variants it may be filled with filling material.

The package structure 102 may comprise, for example, at least one of a first planar element 108, a second planar element 112, and at least one lateral element 110 (the lateral element 110 may be a planar element). The at least one lateral element 110 may be elongated in a direction parallel to the thickness of the package 100. The first planar element 108 and the lateral element(s) 110 may form (e.g., integrated in one single element) a lid 106, while the second planar element may be a laminate (different variants may be provided). At least one of the first and second planar elements 108 and 112 may be used as a substrate. The package structure 102 may have a thickness between 1 and 2 mm, e.g., between 1.6 and 1.8 mm, e.g., of 1.7 mm. The package structure 102 may have horizontal dimensions (e.g., perpendicular to the direction of the thickness) such that tat least one horizontal dimension is greater at least four times the thickness. One first horizontal dimension of the package structure 102 may be between 6 and 18 mm, e.g., between 10 and 14 mm, e.g., of 12 mm. One second horizontal dimension of the package structure 102 may be between 4 and 12 mm, e.g., between 7 and 9 mm, e.g., of 8 mm. The planar elements 108, 112 and/or the lateral element 110 of the package structure 102 may be in electrically insulating material. The thickness of the at least one lateral element 110 (which extends perpendicularly to the thickness of the package 100) may be larger than the thickness of the first and/or second planar elements 108, 112.

The first planar element 108 may define one first inner surface 108a and one first outer surface 108b. The second planar element 112 may define one second inner surface 112a and one second outer surface 112b. The at least one lateral element 110 may define at least one lateral inner surface 110a and at least one lateral outer surface 110b.

At least one acoustic sensor element 120 (in this case a plurality of acoustic sensor elements) may be housed in the inner volume 104. The at least one acoustic sensor element 120 may operate as a microphone. At least one acoustic sensor element 120 may be applied to at least one of the inner surfaces (e.g., 108a and/or 112a), to convert acoustic waves arriving from the exterior of the package 100 into acoustic information in the form of electric signals.

The first and second inner surfaces 108a and 112a may face each other, separated by the inner volume 104.

At least one millimeter wave sensing element 140 (which may be formed by a plurality of millimeter wave sensing elements) may be applied to at least one of the outer surfaces (e.g., 108b and/or 110b and/or 112a). Each millimeter wave sensing element 140 may be configured to at least receive radar signals that have been reflected by objects located in the exterior of the package 100. In addition or alternatively, the millimeter wave sensing element 140 may be configured to generate the radar signals in question which are to be reflected by the objects. In some configurations, all or part of the elements 140 may be selectively configured to emit or receive radar signals at a given time.

The reflected radar signals are destined to be processed, e.g., by a circuitry described below, to provide information about the objects. The information may consist of or include one or more of the distance between the package 100 and an object, a speed of an object, a direction of movement of an object, a nature of a nature object, such as the fact that it is a living object such as a person, the state of that living object, etc.

For example, a plurality of millimeter wave sensing elements 140 may be provided on the outer lateral surfaces 110b.

A circuitry 160 may be housed within the inner volume 104. The circuitry 160 may be arranged to at least one of the inner surfaces (e.g., 108a and/or 112a) of the package structure 102. The circuitry 160 may be electrically connected (e.g., in input) to the at least one acoustic sensor element 120 and (e.g., in input/output) to the at least one millimeter wave sensing element 140, to process the acoustic information and the positional information.

The circuitry 160 may comprise digital circuitry and/or analog circuitry. Application-specific integrated circuit, ASIC, devices may be part of the circuitry 160. Among the digital circuitry, at least one processor (e.g., a digital signal processor, DSP) may be present (and may be part of the ASIC devices). The DSP may integrate, for example, digital-to-analog converter(s), DAC(s), and/or analog-to-digital converter(s), ADC(s). There may be defined a millimeter wave sensing processor 166 (or radar processor) which may process the positional information obtained by the at least one millimeter wave sensing element 140. There may be defined an acoustic processor 168 (or beamforming processor or microphone processor) which may process the acoustic information obtained by the at least one acoustic sensor element 120. The two processors 166, 168 may be connected to each other. (In FIG. 1, only one processor is shown, which covers the other one.) In some examples, the processors 166, 168 are part of the same processor which performs two different functions.

Elements of the circuitry 160 (e.g., the processors 166, 168) may be electrically connected to each other and/or to other elements via second metal traces 172, which may be arranged on the second inner surface 112a, for example. Output ports (e.g., pins) of elements of the circuitry 160 (e.g., the processors 166, 168) may be bonded (e.g., soldered) to the second metal traces 172, for example.

Each of the processors 166, 168 may be connected, for example, to input/output, I/O, ports 190. At least one of the I/O ports 190 may arrive at an external surface of the package structure 102, e.g., in correspondence to the second outer surface 112b (in other examples, least one of the I/O ports 190 may be in correspondence to the first outer surface 108b). For example, at least one I/O port 190 may be connected to a second metal trace 172 (and consequently to the circuitry 160) through a via 192, which is prolonged in the thickness direction between the second outer surface 112b and the second inner surface 112a.

The at least one acoustic sensor element 120 may be applied to the second planar element 112, e.g., engaged to the second inner surface 12a (in variants, in the first planar element 108, e.g., engaged to the first inner surface 108a). For each acoustic sensor element 120, a through-bore 122 in the package structure 102 (e.g., in the second planar element 112) may be provided, so as to permit acoustic waves to reach a membrane capacitor or another type of element capable of transducing acoustic waves into electric signals. The at least one acoustic sensor element 120 may be electrically connected, e.g., through a wire 128, to one of the second inner traces 172 (in variants, other electrical connections may be provided).

The circuitry 160 may comprise (e.g., interposed between the at least one sensor element 120 and the acoustic processor 168), at least one filter element 170, which may comprise, for example, a passive filter, e.g., including inductance(s), resistor(s), capacitor(s). The filter element 170 may be part of analog circuitry interposed between the digital circuitry (e.g., processors 166, 168) and the at least one acoustic sensor element 120. Electric connections between the at least one filter element 170 and/or the processors 166, 168 and/or the at least one acoustic sensor element 120 may be provided by second inner traces 172 (e.g., to which the parts of the at least one filter element 170 may be bonded and/or soldered). The electric signals filtered by the at least one filter element 170 are input to the acoustic processor 168, so that the acoustic processor 168 may process filtered acoustic information without excessive processing.

It has been noted that a particularly suitable position, for each acoustic sensor element 120, is a peripheral position, e.g., closer to the at least one lateral element 110 than the circuitry 160 (e.g., the processors 166, 168, and/or the at least one filter element 170). Accordingly, each acoustic sensor element 120 may be reached by different acoustic waves according to different directions. For several applications, such as, e.g., acoustic beamforming, this is a huge advantage, as sounds from different directions may be captured. The processors 166, 168 may have a central position, while the at least one filter element 170 may have a position intermediate between the position of the processors 166 and 168 and the positions of the multiple acoustic sensor elements 120.

The at least one millimeter wave sensing element 140 may be placed, for example, in or on at least one of the external surfaces, such as the first outer surface 106a and/or at least one outer lateral surface 110b. The at least one millimeter wave sensing element 140 may be bonded and/or soldered to the package structure 102. The at least one millimeter wave sensing element 140 may transmit and/or receive electromagnetic waves and operate as antenna (e.g., a patch antenna), or an antenna element of an antenna array. Transmissions and receptions of millimeter wave sensing elements 140 may be coordinated by the processor 166, so as to operate as a radar, for example, for localizing objects outside the millimeter wave sensing processor 166.

A preferable position for placing multiple millimeter wave sensing elements 140 may correspond to lateral outer surfaces 110*b*: when the package 100 is positioned horizontally (i.e., the thickness extending in vertical direction), the millimeter wave sensing elements 140 may locate several positions according to different directions. In other cases, at least one multiple millimeter wave sensing element 140 may be placed on the first outer surface 108*b*.

Therefore, it is possible to obtain a device which is acoustically and electromagnetically directional.

It is notwithstanding not always easy to electrically connect the at least one millimeter wave sensing element 140 to the circuitry 160. It has been noted that it could result difficult, in some cases, to make vias in the at least one lateral element 110, by virtue of its reduced dimension. Moreover, the presence of the acoustic sensor elements 120 (in particular in the lateral position), as well as that of the filter elements 170, complicates the possibility of connecting the at least one millimeter wave sensing element 140 to the millimeter wave sensing processor 166. Also the I/O ports 190 are of hindrance. Further, it would not be safe to connect the at least one millimeter wave sensing element 140 to external traces that on the second external surface 112*b*, which also hosts I/O ports 190.

However, it has been understood that it is possible to connect the at least one millimeter wave sensing element 140 to the circuitry 160 through connections which pass through the first planar element 108, instead of the second planar element 112 and the lateral element(s) 110. For examples, it is possible to connect the at least one millimeter wave sensing element 140 to the circuitry 160 through at least one columnar connection 142 prolonged between the first planar element 108 and the second planar element 112. At least one external metal trace 144, arranged on an exterior surface of the package 100, may be electrically connected to the at least one millimeter wave sensing element 140. The at least one external metal trace 144 may be electrically connected to the at least one columnar connection 142, e.g., through a via connection 162 which passes through the first planar element 108 from the first outer surface 108*b* to the first inner surface 108*a*. The via connection 162 may be electrically connected to the at least one columnar connection 142, e.g., through a first inner metal trace 164, which may be arranged on the first inner surface 108*a*. The at least one columnar connection 142 may be electrically connected to the circuitry 160 (e.g., to the millimeter wave sensing processor 166) via second inner metal traces 172, onto which the at least one columnar connection 142 may abut.

By "climbing down" from above, the at least one columnar connection 142 (or, more in general, the obtained connection) therefore arrives directly to the millimeter wave sensing processor 166. This connection permits to bypass the at least one lateral element 110, the acoustic sensors 120, the filter elements 170, and the I/O ports 190. By making use of the first planar element 108 (which is in general not occupied by I/O ports and may be occupied, at worst, by millimeter wave sensing elements 140 and/or acoustic sensor elements 120), the use of the space is optimized, without impairing the safety of the I/O connections and without making complicated through-bores in the at least one lateral element 110.

As for the metal traces 144, advantageously, each millimeter wave sensing element 140 is connected to the circuitry 160 using one or more corresponding metal trace 144.

Advantageously, for at least one millimeter wave sensing element 140, one or more of the associated metal trace 144 stretches over all or part of the exterior surface of at least one planar element of the package 100.

For instance, all or part of the metal traces 144 are arranged on at least the first outer surface 108*b*.

Advantageously, for at least one millimeter wave sensing element 140, one or more of the associated metal trace 144 stretches along the outer surface of at least two separate planar elements, for instance the first outer surface 108*b* and one of the lateral surfaces 110*b*. It should be noted that a corresponding metal trace may then only stretch over a portion of one or more of the surface. This portion may only amount to a small portion of the corresponding surface, and may correspond to a distance for instance inferior or equal to 10% of the characteristic dimension of this surface. Segment 144*a* in FIG. 2 is a part of the trace 144 in a lateral outer surface 110*b*, while a remaining segment 144*b* of the trace 144 stretches over the first outer surface 108*b*.

Figure 2:
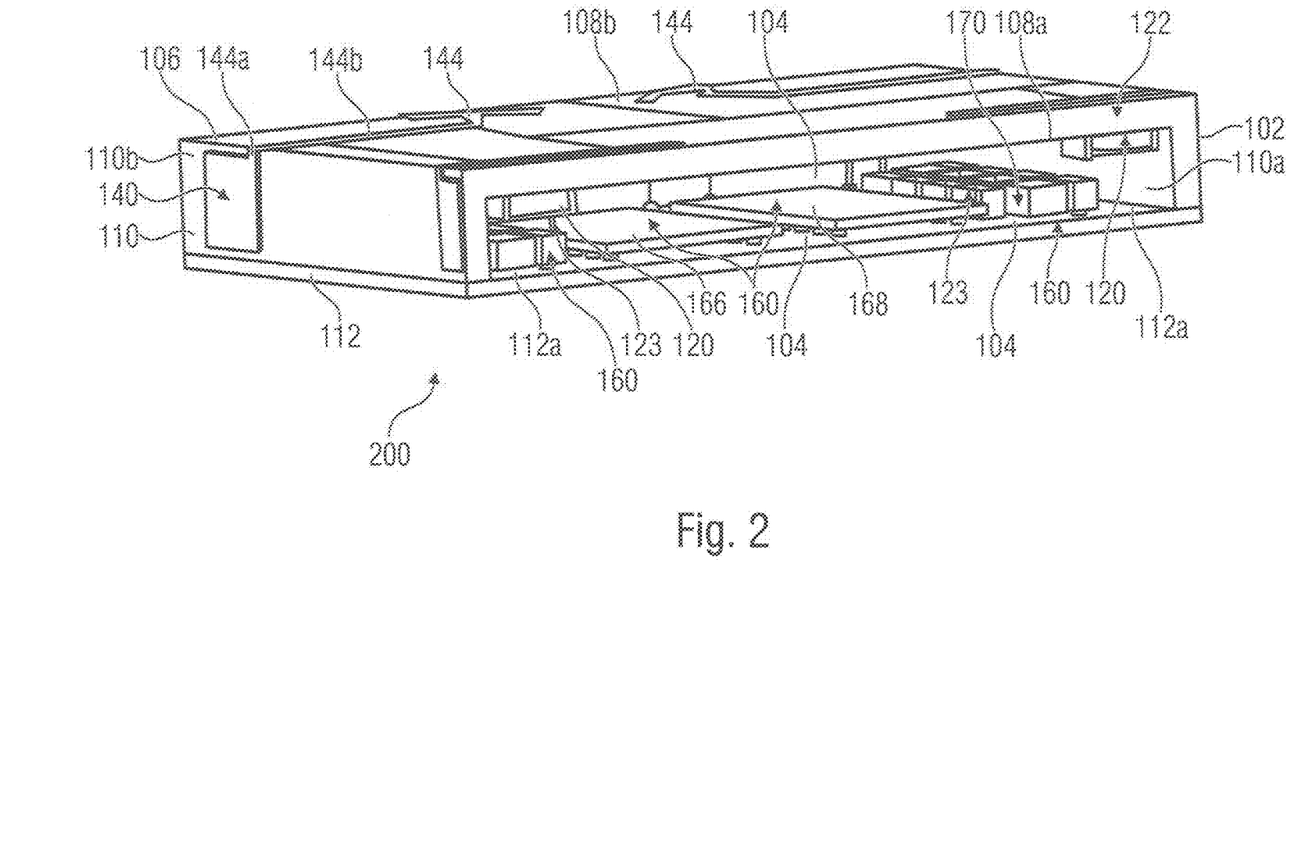
FIG. 2 shows a cross-sectional axonometric view of a package according to another example.
Figure 3A:
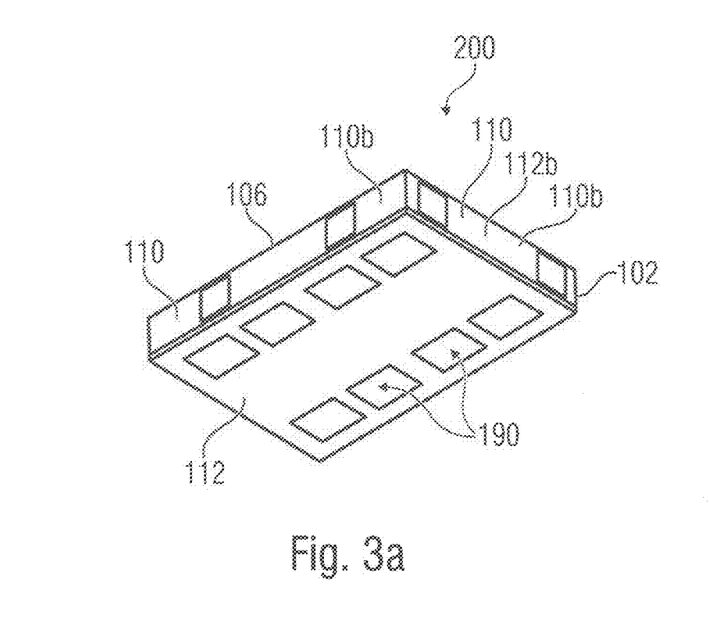
FIGS. 3a and 3b show axonometric views of the package of FIG. 2.
Figure 3B:
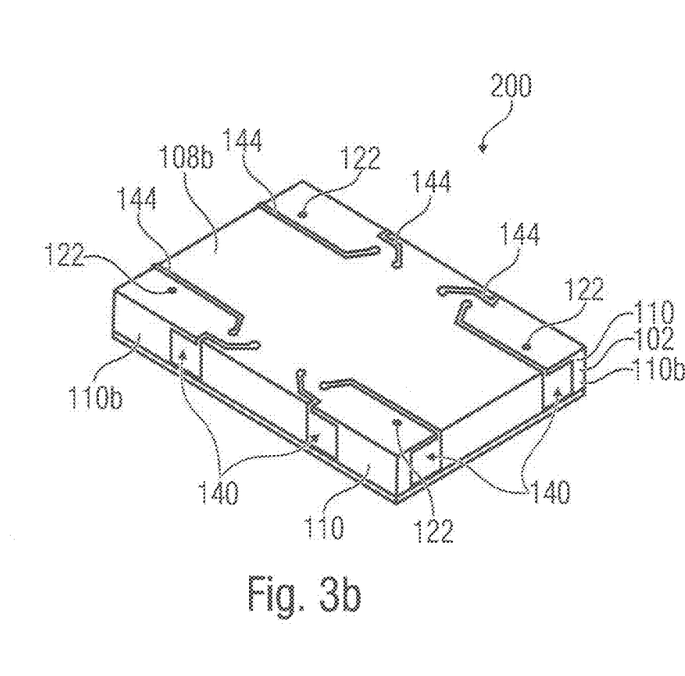

FIGS. 2-3*b* show a variant, according to which a package 200 has at least one acoustic sensor element 120 in the first planar element 108. For example, a plurality of acoustic sensor elements 120, e.g., four of them, may be provided. For example, at least one through-bore 122 may be in the first planar element 108. At least one millimeter wave sensing element 140 may be provided in the at least one lateral element 110 (which may be a planar element). In this case, a plurality of millimeter wave sensing elements 140 is provided. For each of four lateral elements 110, two millimeter wave sensing elements 140 may be provided. Hence, the package may have, for each of its four angles, one millimeter wave sensing element 140 and two millimeter wave sensing elements 140 (the latter being perpendicular to each other, but both in vertical direction, parallel to the thickness direction of the package 100). Other configurations may be provided. The I/O ports may be in the second planar element 112. While the package 200 has a lid 106 in which the first planar element 108 and the lateral elements 110 are integrate in one piece, there may be variants in which the first planar element 108 and at least one of the lateral elements 110 are not in one single piece, but are bonded to each other.

By differentiating the planar elements for the at least one millimeter wave sensing element 140 and the I/O ports 190, the spatial organization is optimized. In fact, the millimeter wave sensing elements 140 do not "steal" any surface away from the I/O ports (and vice versa) in the second outer planar surface 112*b*, while the first outer planar surface 108*b* is occupied, at worse, by the millimeter wave sensing elements 140 (which may notwithstanding be placed in the lateral elements 110) and by external metal traces 144. As shown by FIG. 3*b*, however, the space requested by the external metal traces 144 is not excessive.

However, it is necessary to find out a suitable electrical connection between the at least one acoustic sensor element 120 and the circuitry 160. It has been understood that it is possible to connect at least one acoustic sensor element 120 to the circuitry 160 by relying on columnar connections 123 which are prolonged, in the thickness direction, between the first inner surface 108*a* and the second inner surface 112*a*, e.g., to reach a second inner metal trace 172. Accordingly, the electrical connection provided by the at least one columnar connection 123 arrives directly to the circuitry 160, in particular in correspondence to the at least one filter element 170.

It has been experienced that the implementation of so much electronic components (processors 166, 168, radar equipment, etc.) in a so miniaturized package tends to dissipate a large amount of energy as compared to the package's dimensions. This is extremely inconvenient, due to the high sensitivity of the acoustic sensor element(s) 120 to heat.

However, it has been understood that there is the possibility of implementing the package without endangering the safety of the acoustic sensor element(s) 120. For example, a technique has been developed in which the inner volume 104 of the package is filled with a filling material.

Figure 4:
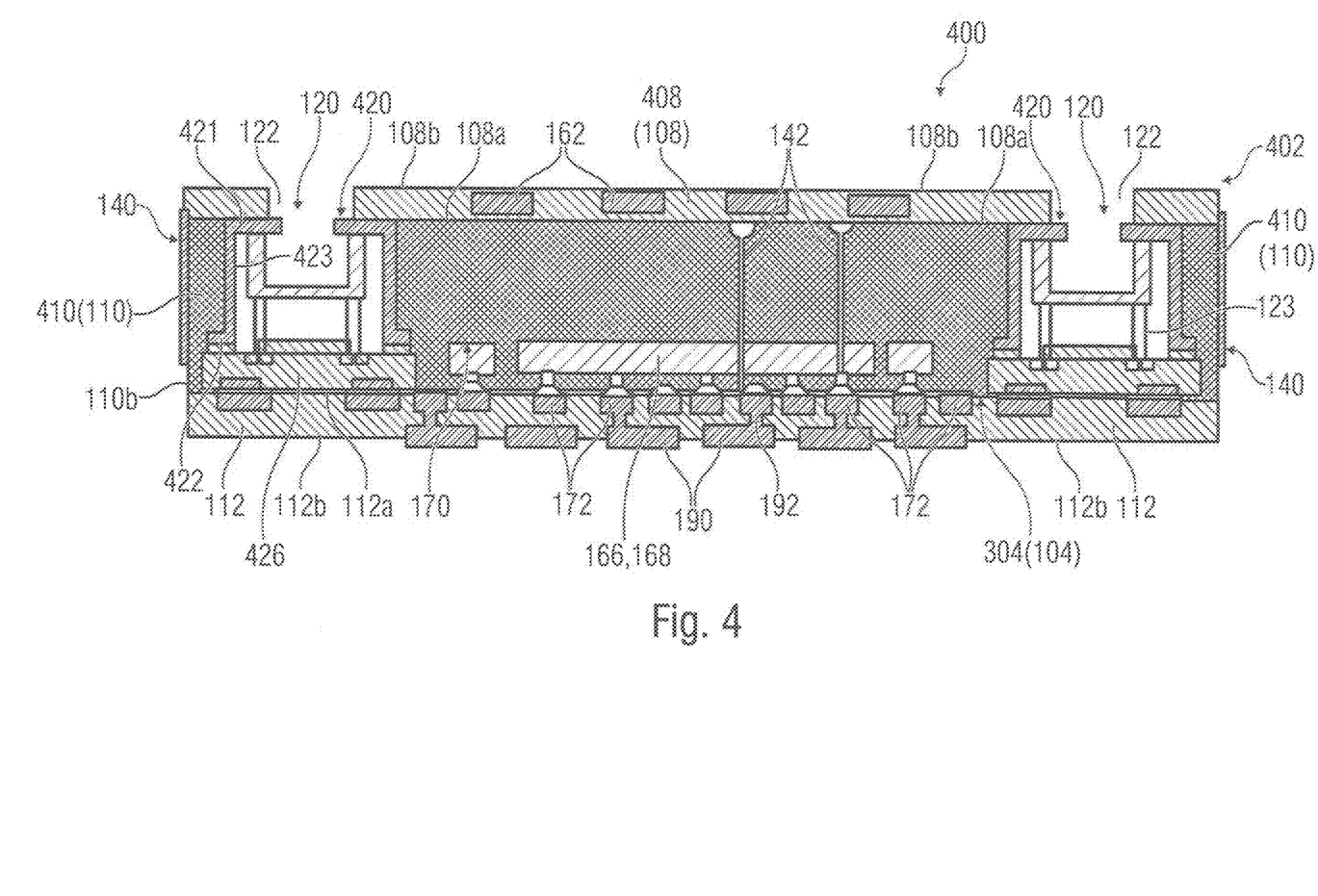
FIG. 4 shows a cross-sectional view of a package according to another example.

FIG. 4 shows a package 400 presenting a package structure 402. In this case, the inner volume 104 may be filled at least in part by a filling material 304. The filling material 304 may be configured to at least thermally shield the acoustic sensor element(s) 120 from the heat generated during operation of the circuitry.

The filling material 304 may be for instance a molding.

The filling material may be a heat conducting material. In examples, the filling material may be at least partially exposed, so as to covey heat towards outside for example, through the outer lateral surface 110b, and/or through thermal via(s) (not shown). For example, heat may be conveyed to a heat sink, e.g., provided externally (e.g., on the board on which the package is mounted). In case the package does not been to be cooled, thermally insulating material may be used. Silicone gel or epoxy of filling polymers may be used.

Advantageously, the filling material 304 encapsulates the circuitry 160 at least in part, so as to thermally shield the acoustic sensor elements 120 from the circuitry 160. Preferably, the filling material 304 entirely encapsulates the processors 166, 168. The filling material may be an epoxy molding compound or thermal interface material (TIM), e.g. with silicon base, with or without fillers.

In examples, the circuitry 160 is at least partially connected, e.g., though a non-shown exposed pad, to an external heat sink (e.g., in metal) which discharges heat.

The filling material may make up one or more planar element, for instance one or more planar lateral element 410, which may therefore appear as solid elements. The filling material 304 may be an electrically insulating material (such a solution may also be provided for the preceding examples).

In this example, instead of the lid 106, the first planar element 408 (108) and at least one planar lateral element 410 (110) may be made from different elements not integrated in one single piece (such a solution may also be provided for the preceding examples).

Basically, the package structure 402 may in this example, be obtained by the first planar element 408 (108) and at least one planar lateral element 410 (110) and by the filling material 408 which also constitutes the lateral element(s) 410.

The package structure 402 may therefore have a solid, massive structure.

At least one millimeter wave sensing element 140 may be applied to the first planar element 408 (108) (which has at least one through-bore 122 for permitting sound to arrive at the at least one millimeter wave sensing element 140, e.g., at the membrane). At least one columnar connection 123 may be prepared for the electrical connection between the at least one millimeter wave sensing element 140. I/O ports 190 may be applied to the second planar element 112. In other examples, however, at least one millimeter wave sensing element 140 may be applied to the second planar element 112, as in the example of FIG. 1.

In this example, the first and the second planar elements 408 (108) and 112 may be similar elements and/or in the same material and/or have substantially the same thickness (such a solution may also be provided for the preceding examples), but in other examples, they may be different from each other.

In examples above and/or below, metal traces 172, 144, 164 may be printed (or otherwise obtained) on the respective surfaces.

The acoustic sensor elements 120 may be provided, here, as package acoustic sensor elements 420. These package acoustic sensor elements 420 may be manufactured independently, in previous steps, and inserted on the second planar element 112 before the filling material 304 is inserted. After that, the package acoustic sensor elements 420 results encapsulated in the filling material 304.

A package acoustic sensor element 420 may comprise an external package structure including, for example:

a first package acoustic sensor element planar element 421, which may abut and/or be parallel to the first planar element (and, for example, to the first internal surface 108a); and/or a second package acoustic sensor element planar element 422, which may be parallel to the second planar element (e.g., the internal surface 112a); and/or a third package acoustic sensor element planar element 423, which may extend in the thickness direction (vertical direction in FIG. 4) e.g., externally adhering to the filling material 304; and/or a planar basement 426, which may abut and/or be parallel to the second planar element 112.

The second package acoustic sensor element planar element 422 may abut and/or to the planar basement 426. The planar basement 426 may present electric connections to second inner metal trace 172. The external package structure of the package acoustic sensor element 420 (either that disclosed here or another variant) separates the elements of the acoustic sensor elements 120 (e.g., the membrane capacitor) from the filling material 304.

In some examples, the package may be filled with material which is not necessarily thermally insulating. For example, filling material may be used for insulating the circuitry from moisture or liquids, e.g., in case heat dissipation is not a concern, but the insulation from humidity is notwithstanding important.

Whether the thermal insulation and/or the environmental protection are needed, this choice may be application-specific.

Figure 5:
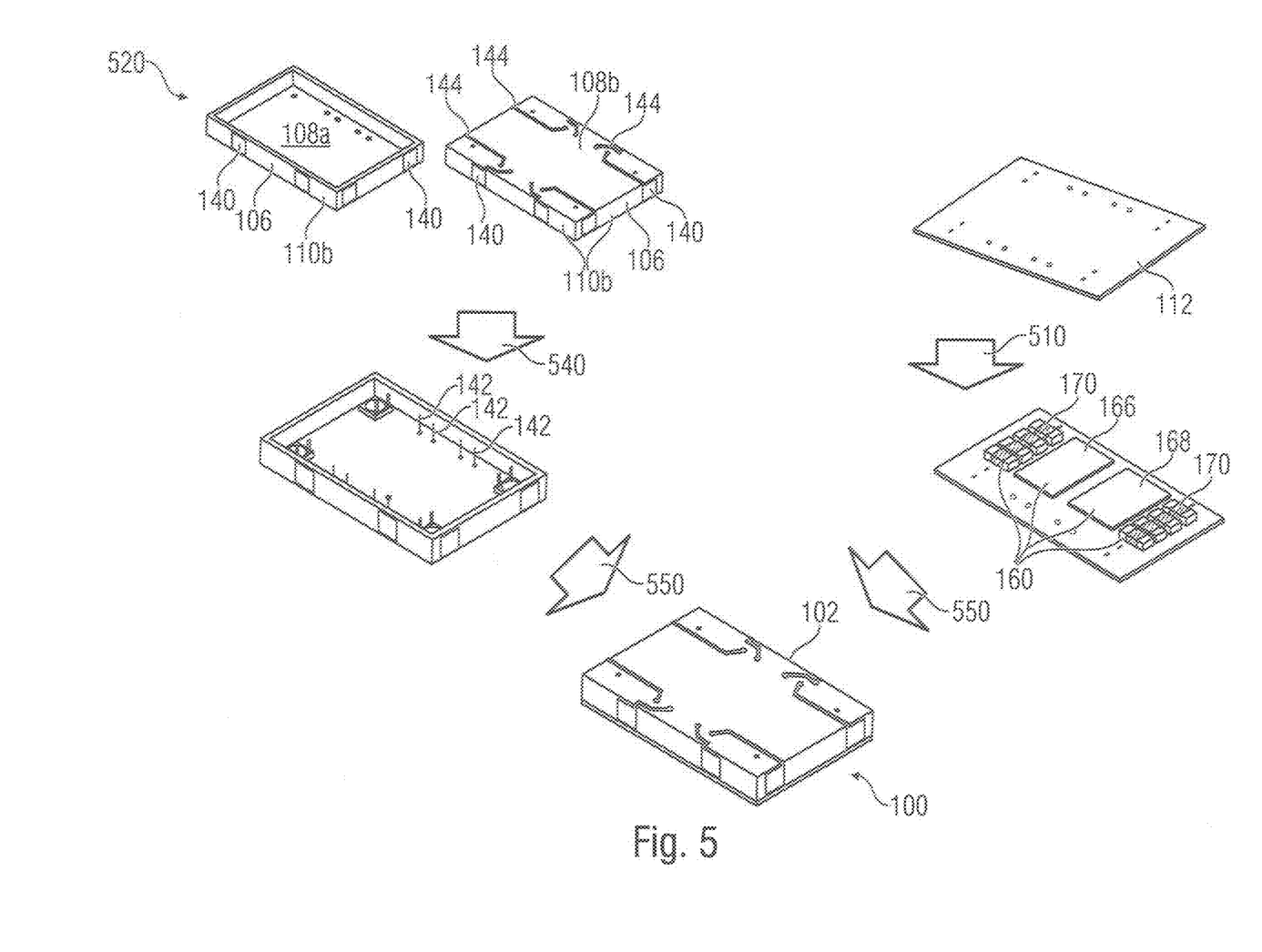
FIG. 5 shows steps of a method for manufacturing a package according to an example.

FIG. 5 shows a method 500 that may be used to manufacture one of the packages 100, 200, or other packages.

The method 500 may comprise a step 510 of applying circuitry 160 (166, 168, 170) to a substrate 112 (,., the second planar element 112).

The method 500 may comprise a step 520 of applying millimeter wave radar element(s) 140 and external metal trace(s) 144 to an external surfaces 108b and/or external lateral surfaces 110b of a lid 106 or of a further substrate and/or of lateral elements.

The method 500 may comprise a step (not shown) of applying first internal metal trace(s) (164) to an internal surface 108a of the lid 106 or of the further substrate, the first internal metal trace(s) 164 being electrically connected to the external metal trace(s) 144 (,., using vias 162).

The method 500 may comprise a step (not shown) of applying microphone element(s) (,., the elements 120) to the substrate 112 or to the internal surface 108a of the lid 106 or of the further substrate.

The method 500 may comprise a step 540 of preparing electric connection element(s) (which may be columnar connection elements 142) in preparation of the electrical connection between the millimeter wave radar element(s) 140 and the circuitry 160.

The method 500 may comprise a step 550 of mechanically connecting the lid 106 or further substrate to the substrate 112, so as to obtain an electrical connection between the millimeter wave radar element(s) 140 and the circuitry 160.

There may also be provided as step of preparing at least one of the connection elements 142 as columnar connections which prolongs in the thickness direction of the lid 106 or of the second substrate so that, when mechanically connecting the lid 106 or further substrate to the substrate (112), the at least one of the connection elements 142 abuts on one internal metal trace 172.

A variant of the method 500 for manufacturing the package 400 may comprise at least some of the following steps:
applying circuitry 160 to a substrate 112;
applying first internal metal trace(s) 164 to an internal surface 108a of a further substrate 408, the first internal metal trace(s) 164 being electrically connected to the external metal trace(s) 144;
applying package acoustic sensor element(s) 420 to the substrate 112 or to the further substrate 408;
preparing electric connection element(s) 142 in preparation of an electrical connection with the circuitry 160;
mechanically connecting the further substrate 408 to the substrate 112, so as to obtain an electrical connection between the electric connection element(s) 142 and the circuitry 160; and
inserting liquid filling material in the void space 104 between the further substrate 408 and the substrate 112.

The method may comprise applying millimeter wave radar element(s) 140 and external metal trace(s) 144 to an external surface 108b and/or external lateral surfaces 110b of the further substrate 408. When the millimeter wave radar element(s) 140 are applied to the external surface 110b, this step is performed after the solidification of the filling material 304. Otherwise, if the millimeter wave radar element(s) 140 are only applied in the external surface 108b of the further substrate 408, it is not necessary to apply the millimeter wave radar element(s) 140 after the solidification of the filling material.

In examples, the filling material may be inserted with a technique known as film assisted molding. Accordingly, the liquid filling material is inserted laterally from a first side (e.g., a left side in FIG. 4), while a flexible film covers other sides (including, e.g., a right side in FIG. 4) and/or regions of the structure. Accordingly, filling material is inserted into the void space between the substrate 112 and the further substrate 408, but does not overflow from the inner volume 104.

With the package above, it is possible to have, within one single package structure, all the necessary equipment for performing audio beamforming. Microphone-array advanced techniques may be performed, for example, for noise suppression, e.g., on the basis of the position of the sound source, as localized by a radar function. Therefore, a voice recognition system may be obtained, e.g., containing a package as above.

Figure 6A:
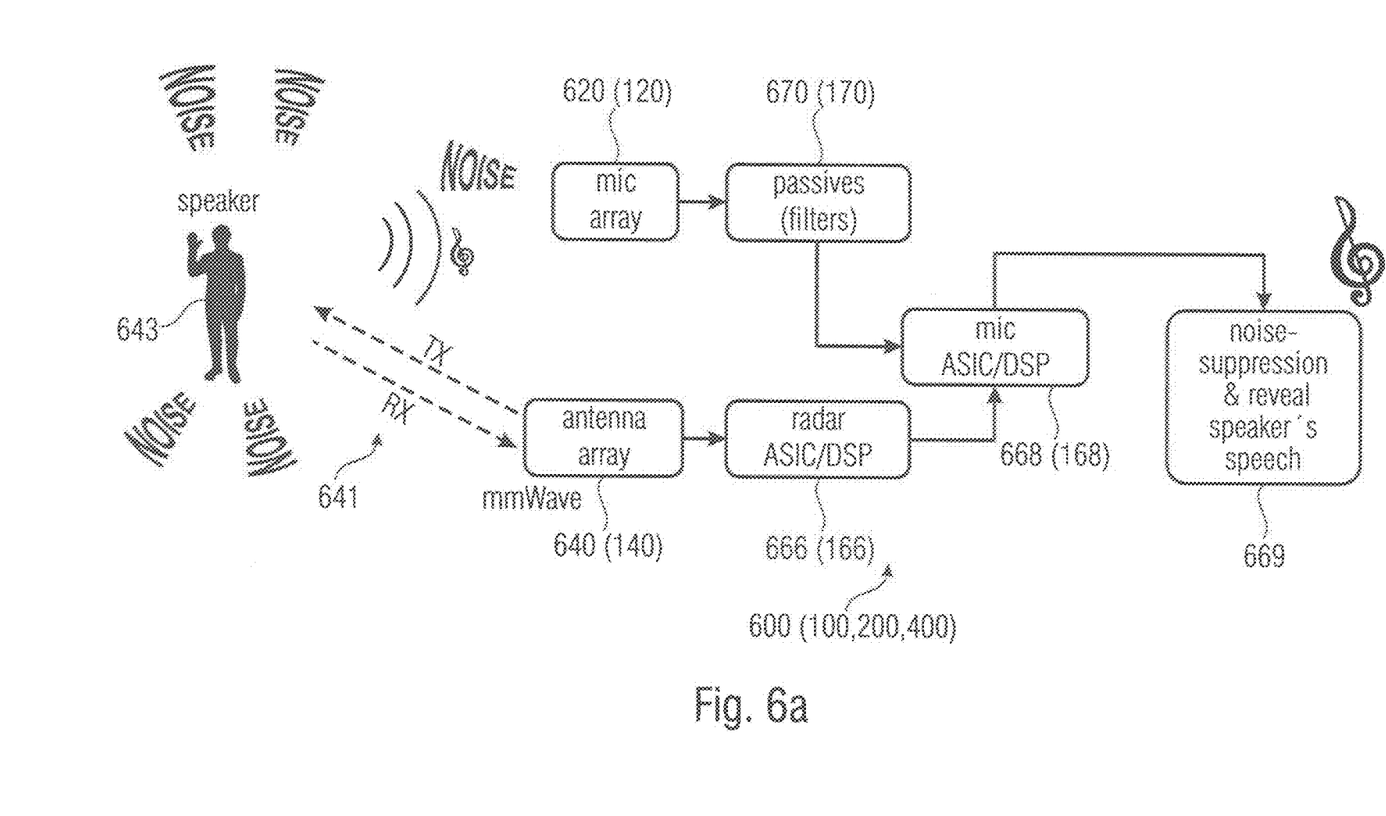
FIG. 6a shows a block-scheme of a system according to an example.

FIG. 6a shows a system 600 which may be implemented, for example, using one of the packages 100, 20, and/or 400 as above. The system may comprise, for example, a microphone array 620, formed by a plurality of acoustic sensor elements 120. A filter group 670, e.g., formed by filter elements 170, may be downstream of the microphone array 620. The filtered output from the filter elements 170 may be provided to a microphone ASIC/DSP 668, which may be the processor 168. The system 60000 may comprise an antenna array 640, formed by a plurality of millimeter wave sensing elements 140. The antenna array 640 may be controlled by a radar ASIC/DSP 666, which may be the processor 166, to perform transmissions and receptions 641 to localize objects (e.g., a human speaker 643). The antenna array 640 my output positional data in form of electric signals to the radar ASIC/DSP 666, for example. The radar ASIC/DSP 666 may provide localization data regarding object(s) identified in the environment to the microphone ASIC/DSP 668. On the basis of the localization data provided by the radar ASIC/DSP 666, the microphone ASIC/DSP 668 may proceed by performing acoustic beamforming and/or by suppressing noise and/or by retrieving the speaker, with a function 669.

Figure 6B:
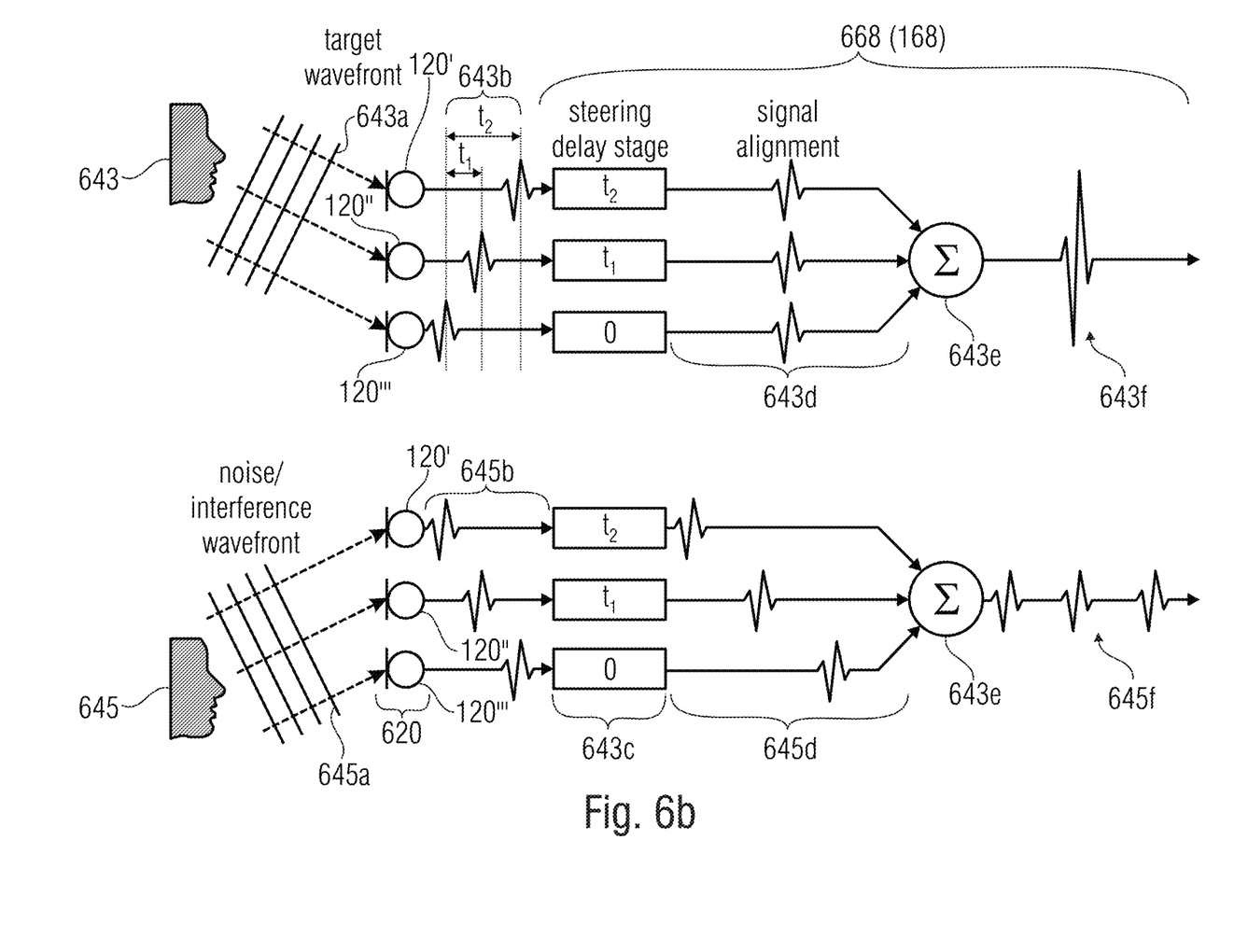
FIG. 6b shows a functional scheme of a system according to an example.

An example of operations is provided by FIG. 6b (some elements, such as each of the three acoustic sensor elements 120', 120'', 120''' is represented as it were in two different positions, only for clarity). A first speaker 643 is the sound source, while simultaneously a second speaker 645 generates noise. It is intended to obtain a satisfactory version of the speech (target wavefront 643a) of the sound source 643 and to reduce, if possible, the noise (noise/interference wavefront 645a).

It may be seen that the target wavefront 643a reaches the sensor element 120' before the sensor element 120'', which is turns is reached before the sensor element 120''', as a consequence of sound having a finite speed and the sensor elements 120', 120'', 120''' being placed in different positions with respect to each other. Accordingly, the three version of the electric signals 643b generated by the sensor elements 120', 120'', 120''' are different from each other according to delays of $t_1$ and $t_2$. However, at the microphone ASIC/DSP 668, the signals provided by the different sensor elements may be aligned, by applying shifts of $t_1$ and $t_2$, at a steering delay stage 643c. Accordingly, three signals 643d are obtained, which are not delayed with respect to each other. At a stage 643e, the three signals may be summed with each other, to obtain an amplified version 643f of the sound generated by the sound source 643.

Also for the noise wavefront 645 the noise arrives at the sensor elements 120', 120'', 120''' at different time instants, to obtain version of the signal 645b which are delayed with respect to each other. If the noise source 645, as expected usual, is positioned at a different position with respect to the sound source 643, the delays are in general not the same of delays of $t_1$ and $t_2$. However, even in this case, the steering delay stage 643c applies the same shifts of $t_1$ and $t_2$ that are used for the sound source 643. Accordingly, in the steered version 645d, the noise signals are not aligned with each other. Accordingly, when summed to each other at stage 643e, the final versions 643f of the noise signals are not amplified. As the noise signals and the target signals are superposed with each other, the target sound is amplified, while the noise sound is not amplified.

The process above is possible because the it is possible to localize the sound source 643 by virtue of the radar application provided by the radar ASIC/DSP 666 on the basis of the transmissions/receptions performed by the patch antennas (millimeter wave sensing elements) 140. Once the positions of the sound source 643 in the environment is known, it is simply possible to infer the delays $t_1$ and $t_2$, and to apply, at the steering delay stage 643c, shifts of the same values of $t_1$ and $t_2$. Techniques may be implemented for distinguishing the sound source 643 from the noise source 645. Gesture recognizing techniques, for example, may be implemented. Otherwise, it is possible to recognize the closest sound source and consider it as the object sound source, while considering the remaining sound sources as noise sources.

When the patch antennas (millimeter wave sensing elements) 140 are placed on the lateral elements 110, it is in particular possible to span the complete space around the system 600. Normally, people are distributed in different horizontal positions, but they are all in the same vertical place. Accordingly, the system 600 may be positioned, for example, on a table, so as to span the entire environment around the table. When the acoustic sensor elements 120 are engaged to the second planar element 112 (as in FIG. 1), it is simply necessary to use an external support (not shown) which supports the package 100 without covering the through-bores 122. The external support may have a columnar shape with an upper surface including I/O ports counterformed to the I/P ports 190.

Advantages of embodiments of the present invention include the ability to obtain a package structure of extremely reduced dimensions.

What is claimed is:

1. A package comprising:
 a package structure which defines inner surfaces delimiting an inner volume and outer surfaces directed towards an exterior of the package;
 at least one acoustic sensor element disposed on at least one of the inner surfaces, the at least one acoustic sensor element configured to convert acoustic waves arriving from the exterior of the package into electric signals representing acoustic information;
 a plurality of millimeter wave sensing elements disposed on at least one of the outer surfaces, to receive reflected radar signals from objects in the exterior of the package; and
 circuitry disposed on at least one of the inner surfaces of the package structure, wherein the circuitry is electrically connected to the at least one acoustic sensor element and the plurality of millimeter wave sensing elements to process the acoustic information and the reflected radar signals.

2. The package of claim 1, wherein the package structure comprises a first planar element, which defines a first inner surface, and a second planar element, which defines a second inner surface facing the first inner surface,
 wherein at least part of the circuitry is arranged on the second inner surface and is electrically connected to at least one of the millimeter wave sensing elements by at least one columnar connection prolonged towards the first inner surface.

3. The package of claim 2, wherein the at least one acoustic sensor element comprises a package acoustic sensor element abutting the first and second planar elements.

4. The package of claim 3, wherein the package comprises a filling material filling at least part of the inner volume defined between the first and second planar elements,
 wherein the package acoustic sensor element includes a third package acoustic sensor element planar element adhering to the filling material.

5. The package of claim 1, wherein the package structure comprises a first planar element, which defines a first outer surface and a first inner surface, and a second planar element, which defines a second inner surface facing the first inner surface,
 wherein the package further comprises at least one external metal trace arranged on the first outer surface and electrically connected to at least one of the millimeter wave sensing elements,
 wherein the at least one external metal trace is electrically connected to the circuitry through a via connection which passes through the first planar element from the first outer surface to the first inner surface.

6. The package of claim 1, wherein the package structure comprises at least one lateral element extending in a direction of a thickness of the package structure, the at least one lateral element defining at least one lateral outer surface,
 wherein at least one of the millimeter wave sensing elements is placed on the at least one lateral outer surface.

7. The package of claim 1, wherein the package structure comprises a first planar element, which defines a first inner surface, and a second planar element, which defines a second inner surface facing the first inner surface,
 wherein at least part of the circuitry is arranged on the first inner surface,
 wherein the at least one acoustic sensor element is arranged to sense acoustic waves arriving from the exterior of the package through the second planar element.

8. The package of claim 1, wherein the package structure comprises a first planar element, which defines a first inner surface, and a second planar element, which defines a second inner surface facing the first inner surface,
 wherein at least part of the circuitry is arranged on the second inner surface,
 wherein the at least one acoustic sensor element is arranged to sense acoustic waves arriving from a direction entering from the of the package through the first planar element.

9. The package of claim 8, wherein the at least one acoustic sensor element is connected to the circuitry through at least one columnar connection prolonged along a direction parallel to the direction of a thickness of the package.

10. The package of claim 1, wherein the package structure comprises at least one second planar element defining a second inner surface,
 wherein the package further comprises at least one second inner metal trace arranged on the second inner surface,
 wherein the circuitry comprises at least one digital processor connected to the at least one acoustic sensor element and/or at least one of the millimeter wave sensing elements using the at least one second inner metal trace.

11. The package of claim 1, wherein the package structure comprises a first planar element, which defines a first inner surface, and a second planar element, which defines a second inner surface facing the first inner surface,
 wherein the package comprises a filling material filling at least part of the inner volume defined between the first and second inner surfaces, so as to thermally shield at least one acoustic sensor element from the circuitry.

12. The package of claim 11, wherein the filling material encapsulates at least part of the circuitry.

13. The package of claim 1, further comprising:
 a lid forming a first planar element which defines a first inner surface and at least one lateral element; and
 a laminate forming a second planar element which defines a second inner surface, wherein the circuitry is arranged on the second inner surface.

14. The package of claim 1, further comprising:
a first laminate forming a first planar element which defines a first inner surface; and a second laminate forming a second planar element which defines a second inner surface,
wherein the circuitry is arranged on the second inner surface.

15. A voice recognition system comprising the package of claim 1.

16. A method of manufacturing a package, the method comprising:
applying circuitry to a substrate;
applying millimeter wave radar element(s) and external metal trace(s) to an external surface and/or external lateral surfaces of a lid or of a further substrate;
applying first internal metal trace(s) to an internal surface of the lid or of the further substrate, the first internal metal trace(s) being electrically connected to the external metal trace(s);
applying microphone element(s) to the substrate or to the internal surface of the lid or of the further substrate;
preparing electric connection element(s) in preparation of an electrical connection between the millimeter wave radar element(s) and the circuitry; and
mechanically connecting the lid or further substrate to the substrate, so as to obtain the electrical connection between the millimeter wave radar element(s) and the circuitry.

17. A method of manufacturing a package, the method comprising:
applying circuitry to a substrate;
applying first internal metal trace(s) to an internal surface of a further substrate, the first internal metal trace(s) being electrically connected to external metal trace(s);
applying package acoustic sensor element(s) to the substrate or to the further substrate;
preparing electric connection element(s) in preparation of an electrical connection with the circuitry;
mechanically connecting the further substrate to the substrate, so as to obtain the electrical connection between the electric connection element(s) and the circuitry;
inserting liquid filling material in a void space between the further substrate and the substrate; and
applying millimeter wave radar element(s) and external metal trace(s) to an external surface and/or external lateral surfaces of the further substrate.

18. The method of claim 17, wherein inserting liquid filling material is performed by film assisted molding.

19. The method of claim 17, further comprising:
preparing at least one of the electric connection elements as columnar connection which prolongs in a thickness direction of a lid or of the further substrate so that, when mechanically connecting the lid or further substrate to the substrate, the at least one of the electric connection elements abuts one internal metal trace.

* * * * *

UNITED STATES PATENT AND TRADEMARK OFFICE
CERTIFICATE OF CORRECTION

PATENT NO. : 11,039,231 B2  
APPLICATION NO. : 16/682468  
DATED : June 15, 2021  
INVENTOR(S) : Kok Yau Chua Page 1 of 1

It is certified that error appears in the above-identified patent and that said Letters Patent is hereby corrected as shown below:

On the Title Page

Item (72); Line 2, delete "Johor" and insert --Muar--.

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*